United States Patent
Maskrot et al.

(10) Patent No.: US 9,480,964 B2
(45) Date of Patent: Nov. 1, 2016

(54) DEVICE AND METHOD FOR PRODUCING SUSPENSIONS OR WET PASTES OF NANOPOWDERS OR ULTRA-FINE POWDERS

(75) Inventors: Hicham Maskrot, Montlhery (FR); Benoît Guizard, Creteil (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 578 days.

(21) Appl. No.: 13/825,520

(22) PCT Filed: Sep. 20, 2011

(86) PCT No.: PCT/EP2011/066290
§ 371 (c)(1),
(2), (4) Date: May 31, 2013

(87) PCT Pub. No.: WO2012/038408
PCT Pub. Date: Mar. 29, 2012

(65) Prior Publication Data
US 2013/0248614 A1     Sep. 26, 2013

(30) Foreign Application Priority Data
Sep. 21, 2010 (FR) .................... 10 57561

(51) Int. Cl.
*B01J 19/26*     (2006.01)
*B01J 4/02*      (2006.01)
*B01J 19/00*     (2006.01)

(52) U.S. Cl.
CPC ...... *B01J 19/26* (2013.01); *B01J 4/02* (2013.01); *B01J 19/00* (2013.01)

(58) Field of Classification Search
None
See application file for complete search history.

(56) References Cited

U.S. PATENT DOCUMENTS

| 4,012,209 A | 3/1977 | McDowell et al. |
| 6,156,120 A | 12/2000 | Heffels et al. |
| 7,097,691 B2 | 8/2006 | Taube et al. |
| 2009/0062407 A1 | 3/2009 | Iversen et al. |

FOREIGN PATENT DOCUMENTS

| DE | 10 2006 055 703 | 5/2008 |
| GB | 2 067 908 | 8/1981 |
| WO | 2007/068805 | 6/2007 |

OTHER PUBLICATIONS

International Search Report and Written Opinion for International Application No. PCT/EP2011/066290, mailed Feb. 16, 2012.

*Primary Examiner* — Duane Smith
*Assistant Examiner* — Phillip Shao
(74) *Attorney, Agent, or Firm* — Nixon Peabody LLP; Khaled Shami

(57) ABSTRACT

A device and a method for producing suspensions or wet pastes of nanoparticles or ultra-fine particles. The method comprises: introducing a flow of particles of nanometric or submicronic size into a first compartment of a chamber having a bulk density between 15 and 100 g/L; forming, in the first compartment, a spray of droplets between 1 and 10 micrometers in size, by injecting a solvent in liquid or gas form into a second compartment of the device and passing said solvent through the filtering means, the solvent being chosen from the solvents which are liquid at ambient temperature and at atmospheric pressure; stopping the formation of the spray when the entire quantity of particles contained in the first compartment forms, as required, with the solvent, a suspension comprising between 80 and 99.9% solvent, if the solvent is introduced into the second compartment in liquid form, or a wet paste comprising between 1 and 10% solvent, if the solvent is introduced into the second compartment in gas form; recovering the suspension or wet paste formed.

5 Claims, 1 Drawing Sheet

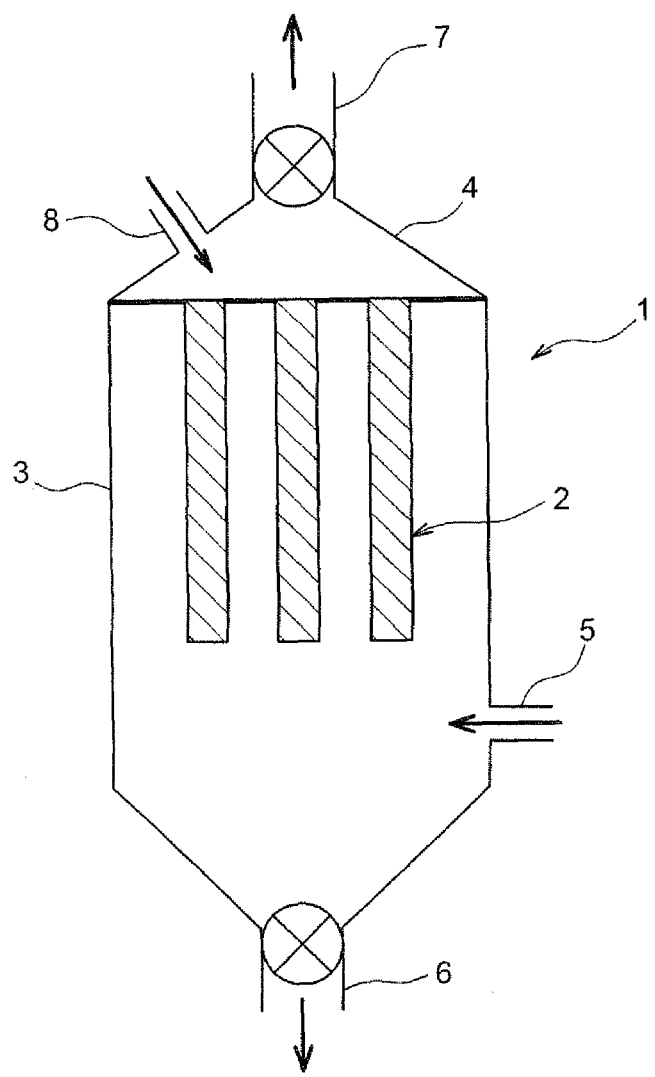

DEVICE AND METHOD FOR PRODUCING SUSPENSIONS OR WET PASTES OF NANOPOWDERS OR ULTRA-FINE POWDERS

CROSS REFERENCE TO RELATED APPLICATIONS OR PRIORITY CLAIM

This application is a National Phase of PCT/EP2011/066290, filed Sep. 20, 2011, entitled, "DEVICE AND METHOD FOR PRODUCING NANOPOWDER OR ULTRAFINE-POWDER SUSPENSIONS OR SLURRIES", which claims the benefit of French Patent Application No. 10 57561, filed Sep. 21, 2010, the contents of which are incorporated herein by reference in their entirety.

FIELD OF THE INVENTION

The invention relates to a device and a method for obtaining suspensions or wet pastes containing nanometric particles (<100 nanometers), also referred to as nanoparticles or nanopowders, or submicronic particles (100-500 nanometers), also referred to as ultra-fine particles or powders.

Hereinafter in the description, for the purposes of examples and to simplify the description, reference is made to nanometric particles or "nanoparticles".

STATE OF THE RELATED ART

Due to the specific properties thereof, nanoparticles have been the subject of growing interest in recent years. Indeed, nanoparticles or nanopowders are used as a raw material or as a finished material in a wide range of industries, such as the aeronautic sector (as a nanocomposite), automotive sector (for producing tyres, paints and catalysts), the energy sector (nuclear, photovoltaics, petrochemicals), the cosmetic sector (as a structural agent or UV barrier), the microelectronic sector (component, tool) and the food processing sector.

Nanopowders are very frequently used and stored in the form of suspensions.

This is due to the fact that, generally, the use or conditioning of nanopowders involves a step for suspending the nanoparticles in a wide variety of solvents or formulations. The preparation and stabilisation of these suspensions is thus a key step in the use and conditioning of the nanopowders. For example, it is possible to cite the case of mineral sun creams, wherein the product quality over time will depend, among other things, on the satisfactory dispersion of the active phase, consisting of the nanopowders (generally, titanium oxide $TiO_2$), in a formulation.

Moreover, some methods for preparing nanopowders, such as for example the electrophoretic infiltration (EPI) method, require the preparation of nanoparticle suspensions, which must have specific properties, particularly in terms of stability, viscosity, mobility and nanopowder concentrations.

Optimising nanopowder suspensions is also critical in microelectronic methods derived from inkjet printing technologies, such as "roll to roll", "microcontact printing" or "stamp printing", used when producing printed circuits, photovoltaic cells or flat screens.

Finally, the suspension of nanopowders would also appear to be a guarantee of occupational safety, since the risks of dispersion of the nanopowders in the human respiratory tract are thus eliminated.

The suspension of nanoparticles may also be used as a means for recovering nanoparticles.

In this respect, it is noted that the various devices for recovering nanoparticles available can be categorised into three groups, according to the nanoparticle recovery method thereof: liquid process (suspensions), wet process (wet paste) and dry process recovery methods.

Dry process nanoparticle recovery devices operate using gas process methods. These devices are particularly suitable for recovering the nanoparticles produced in a gas flow; they generally use solid process recovery devices, comprising filtering barrier manifolds suitable for stopping the nanoparticles, while allowing the gases produced by the process to be discharged. These devices may also use cyclone devices or electrostatic devices.

In these recovery devices, steps for the dry process collection of the nanoparticles are always carried out when the manifolds are full, so as to place the nanoparticles in bags or containers.

However, such collection steps involve a very high risk of nanoparticle exposure for the staff assigned this task. Indeed, the manifolds are opened and, due to the high volatility of nanoparticles (which are frequently in aggregated form), the nanoparticles tend to be instantaneously suspended in the air and can thus be readily air-borne towards the intake airways of the human body (nostrils, mouth, ears, etc.).

One means for protecting the staff in question consists of providing them with all-in-one suits and breathing apparatuses having a suitable filtering capacity or operating with an air supply from a self-contained circuit.

However, such equipment represents a significant additional cost, both in terms of increased intervention time and in terms of the purchase and maintenance of the suits and apparatuses (filters, etc.).

Moreover, due to the volatility thereof, these nanoparticles may be deposited at various points in facilities, if no measure is taken in respect of the confinement thereof.

This represents an additional risk for the staff in charge of cleaning the facilities, and also for the environment since water, air and soil pollution occurs.

Moreover, the confinement means to be used also represent a significant additional cost in the design of facilities, and also in the operation thereof, partly due to the need to replace filters and conduct regular inspections.

An additional risk arises when handling "non-oxide" nanoparticles, due to the high reactivity thereof. Indeed, once the nanoparticles have been placed in bags or containers, they are then introduced into methods intended for the processing thereof with a view to obtaining a product having optimised properties (mechanical, thermal, electrical, magnetic, optical, etc.).

The bags or containers containing the nanoparticles are then opened and the same precautionary measures as those mentioned above are required, giving rise to a further additional cost.

An alternative to the dry processing recovery of nanoparticles is liquid process collection, which, as the name infers, consists of suspending the nanoparticles in a liquid.

This suspension may be carried out either continuously during nanoparticle production or after production.

In the case of continuous mode suspension, the nanoparticles may be suspended in a liquid merely by bubbling using a diffuser, comprising a sleeve perforated with a multitude of holes, for maximising the exchange area between the gas flow and the liquid flow, as described in document WO 2007/068805 A1.

The same document WO 2007/968805 A1 describes that the suspension of nanoparticles in a liquid can also be obtained by spraying the liquid into the gas flow comprising the nanoparticles using a fountain nozzle.

The two solutions proposed in document WO 2007/068805 A1 prove to have poor performances in the case of mass nanoparticle production above 100 g/h of power per 100 L of liquid in the tank. Indeed, the wettability of the nanoparticles is not sufficient to enable satisfactory capture of the particles by the liquid when the gas flow comprises more than $12 \cdot 10^4$ particles per liter.

The nanoparticle suspension may also be obtained by precipitating a precursor vapour through a solvent spray in a conduit connected to a centrifugal pump drawing in both the liquid and the particles (document U.S. Pat. No. 7,097,691 B2). The pump subsequently returns the liquid and the powders to a tank containing a solvent. The pump discharge is preferentially submerged in the liquid contained in the tank. The carrier gas which may be charged with nanoparticles is then vented into the atmosphere. In document U.S. Pat. No. 7,097,691 B2, the authors make reference to recovery of nanoparticles contained in the carrier gas by means of the Venturi effect and point out that mere bubbling does not enable the capture of all the nanoparticles.

In order to enhance the nanoparticle recovery efficiency, spraying systems producing fine droplets are frequently used (document U.S. Pat. No. 6,156,120) These spraying systems systematically consist of injection nozzles which may be of different types (fountain nozzle, ultrasonic nozzle, piezoelectric nozzle).

However, injection nozzles frequently require the use of liquids or gases having a high pressure, of up to several hundred bar. However, the use of high pressures is subject to strict safety regulations.

Furthermore, injection nozzles generate a conical jet, which thus needs to be oriented correctly. This feature in respect of the orientation and shape of jets produced by injection nozzles may favour the presence of aerosol-free zones.

Finally, a further drawback of nozzles is that of frequently being obstructed in the presence of powders.

In order to address these drawbacks of the prior art, the inventors set themselves the aim of designing a device and a method for recovering nanoparticles and ultra-fine particles safely in the form of suspensions (liquid process) or wet pastes (wet process).

It should be noted that the wet process is characterised by a solvent (e.g. water) content by mass between 1 and 10%, whereas the liquid process is characterised by a solvent (e.g. water) content by mass between 80 and 99.9%. It should also be noted that the content by mass consists of the ratio of the solvent mass over the mass of the total suspension (i.e. the solvent and the powder).

DESCRIPTION OF THE INVENTION

This aim is achieved by means of a device for producing a suspension or a wet paste of particles of nanometric or submicronic size, comprising:

a chamber having a first and a second compartment arranged on top of each other;

filtering means arranged in the chamber between the first and second compartments, said means being suitable for preventing the passage of particles of nanometric or submicronic size, while enabling the passage of a fluid, from one compartment to the other;

means for introducing a flow of particles of nanometric or submicronic size having a bulk density between 15 and 100 g/L, situated in the first compartment;

means for discharging gas, situated in the second compartment;

means for injecting at least one fluid, situated in the second compartment, suitable for creating a flow from the filtering means, said flow being inverted with respect to the flow created by the means for introducing a gas flow;

means for outputting the suspension or wet paste of particles;

characterised in that it further comprises means for forming, in the first compartment, a spray formed from droplets of sizes between 1 and 10 micrometers, the means for forming a spray and the filtering means being a single element comprising a high-efficiency filter (as per the European standard EN 1822).

Above and hereinafter, the term "size", applied to particles, refers to the largest size of these particles; the term "nanometric", applied to particles, means that the size is less than 100 nanometers; the term "submicronic", applied to particles, means that the size is between 100 and 500 nanometers.

To determine the particle size, the method described hereinafter may be applied. Firstly, the specific surface area of the particles is measured using the BET (Brunauer, Emmet and Teller) method which provides the surface area:weight ratio (unit $m^2/g^{-1}$) of the particles. The density of the powder particles is then measured using the helium pycnometry method, which gives the weight of the particles per unit of volume. The helium pycnometer is suitable for determining the density of solid, divided or porous material on the basis of the very precise measurement of the volume of a sample of known mass. Finally, the mean particle diameter is calculated, considering each particle to be spherical.

To determine the size of the droplets, the laser light scattering granulometry measurement method may be used, for example.

Moreover, it should be noted that the efficiency of a filter represents the variation of particles between upstream and downstream from the filter with respect to the initial particle concentration upstream from the filter, i.e.:

$$E = \frac{C_o - C_F}{C_o}$$

where $C_O$ represents the particle concentration upstream from the filter and $C_F$ represents the particle concentration downstream from the filter, i.e. the concentration after filtering.

In addition, noting that the filter used in the invention is a high-efficiency filter as per the European standard EN 1822, those skilled in the art would know which maximum features need to be observed by the filter.

The features of high-efficiency filters are measured using the MPPS efficiency measurement method (laser capture test method), determining the efficiency of a filter on the most penetrating particles having a diameter between 0.1 and 0.2 micrometers.

The distinctive features of high-efficiency filters are shown in table format in the appendix of this description.

Within the scope of this invention, a suspension is deemed to be obtained when the solvent percentage is between 80% and 99.9% and a wet paste is deemed to be obtained when the solvent percentage is between 1 and 10%.

It should be noted that, if the solvent is introduced into the second compartment in gaseous form, it may be discharged in the form of droplets at the filter or the first compartment due to solvent condensation, if the temperature of the first compartment and the powder is less than the solvent dew point. Indeed, if the powder and the first compartment (including filters) are at a temperature below the solvent dew point, the gaseous solvent is condensed at the filter outlet, or in contact therewith. For this reason, if a gaseous solvent is used, it is preferable to heat the entire device or humidify the powder just after the synthesis thereof, since the whole (filter, chamber and freshly prepared powder) is still very hot (between 100 and 150° C.).

Moreover, it should be noted that the limitations of the particle bulk density value range according to the invention, i.e. between 15 and 100 g/L, are chosen with care. Indeed, they are chosen such that more than 97% of the volume of the first compartment is always occupied by gas, liquid or vacuum, so that the solvent introduced into the first compartment in droplet form can encompass and capture each powder particle.

Indeed, the density of a powder is intrinsic to the nature of the powder and the method for synthesising same. For example, SiC nanopowders synthesised by laser pyrolysis and having a grain size of 35 nm, have a bulk density of 45 g/l. Similarly, for SiC powder synthesised by laser pyrolysis and having a grain size in the region of 20 nm, the bulk density is 25 g/l.

Given that the theoretical mass of a 1 liter solid block of SiC is 3200 g and that, for 1 liter of SiC powder having a grain size of 35 nm, the density is 45 g, it is known that only 1.4% (i.e. (45/3200)×100) of the volume is occupied by the powder. Consequently, the majority of the volume is occupied by gas or vacuum.

Similarly, using SiC powder having a grain size of 20 nm, the powder occupies 0.78% of the volume.

Advantageously, the fluid injected by the injection means is a liquid solvent at ambient temperature, the fluid being injected in liquid form or in gaseous form and forming the droplet spray at the filter outlet.

Advantageously, the high-efficiency filter is a metallic filter.

Preferably, the filter pore size is less than or equal to 200 nm.

Preferably, the filter comprises one or a plurality of columns whose surface is provided with pores.

Advantageously, the first compartment is situated below the second compartment. The first and second compartments are thus respectively situated in the lower part and in the upper part of the chamber.

Advantageously, the first compartment has an inner volume which is at least two times greater than the inner volume of the second compartment.

The invention also relates to a method for producing a suspension or wet paste of particles of nanometric or submicronic size, using a device as defined above. The method according to the invention comprises the following successive steps:

a) introducing a flow of particles of nanometric or submicronic size into the first compartment of the chamber of the device having a bulk density between 15 and 100 g/L;

b) forming, in the first compartment, a spray of droplets between 1 and 10 micrometers in size, by injecting a solvent in liquid or gas form into the second compartment and passing said solvent through the filtering means, the solvent being chosen from the solvents which are liquid at ambient temperature and at atmospheric pressure;

c) stopping the formation of the spray when the entire quantity of particles contained in the first compartment forms, as required, with the solvent, a suspension comprising between 80 and 99% solvent, if the solvent is introduced into the second compartment in liquid form, or a wet paste comprising between 1 and 10% solvent, if the solvent is introduced into the second compartment in gas form;

d) recovering the suspension or wet paste formed.

Advantageously, the formation of the spray in step b) is obtained by applying a pressure differential between the first compartment and the second compartment, the pressure being lower in the first compartment.

The device and method according to the invention are suitable for the indirect liquid process (suspension) or wet process (wet paste) recovery of optionally large quantities of particles of nanometric or submicronic size, i.e. quantities of up to several tens of kilograms; in fact, since the bulk density values should be between 15 and 100 g/L, it is noted that the quantity of powder is only limited by the capacity of the first and second compartments. For example, if the first compartment has a volume of 150 L, up to 7 kg of powder can be introduced. It is noted that the volume of the second compartment is dependent on the quantity of solvent (e.g. water) to be introduced therein.

Unlike the devices according to the prior art wherein particles are suspended continuously in a liquid process, resulting in devices which are very costly and not necessarily very efficient for productions greater than 1 kg/hr of powders, and particularly for productions of 5 to 10 kg/hr, the device and method according to the invention enable post-synthesis recovery or indirect recovery of nanoparticles, which is a considerably less costly and more efficient alternative.

A further advantage of the method and device according to the invention is that of avoiding dry process handling of powders. Indeed, using particle powder having a density value between 15 g/L and 100 g/L (which is equivalent to very large inter-particle spaces) and using a high-efficiency filter (filtering threshold less than or equal to 200 nm) as the means for spraying liquid solvent or the means for diffusing gaseous solvent vapour (thus making it possible to obtain a micro-droplet spray) is suitable for obtaining satisfactory solvent dispersion in the network formed by the powder particles. The suspension or wet paste obtained may thus contain a large quantity of particles while including no dry process particles.

The suspension of wet paste may then be sent to a system for granulating particles of nanometric or submicronic size (by spray-drying or freeze-drying), to a system for functionalising particles of nanometric or submicronic size (e.g. by means of cold plasma) or to a device for characterising particles (by means of granulometry, turbidimeter, viscometer, spectrometer, etc.).

BRIEF DESCRIPTION OF THE FIGURES

The invention will be understood more clearly and further advantages and features will emerge on reading the description hereinafter, given as a non-limiting example, accompanied by a FIGURE, which is a diagram, according to a sectional view, of the production device according to the invention.

DETAILED DESCRIPTION OF A PARTICULAR EMBODIMENT

As illustrated in the FIGURE, the chamber 1 is equipped with a filter 2.

When the filter 2 is positioned in the chamber, it separates the interior of the chamber into two compartments: a first compartment 3 situated in the lower part of the chamber and a second compartment 4 situated in the upper part of the chamber.

The chamber may consist of two bodies (one forming the upper part and the other the lower part of the chamber) suitable for being screwed into each other; the filter may then be screwed onto one of the bodies and in turn screwed onto the other body.

In our particular example, the chamber 1 is for example a high-capacity manifold, having an inner volume of 135 liters, whereas the filter 2 in this case consists of a set of five high-efficiency metallic filter cartridges. The volume occupied by the filters within the chamber is approximately 5 liters (i.e. 5×0.98 L).

Given that a high-efficiency filter is used, each filter cartridge has a filtering threshold in the region of 100 to 200 nm.

The chamber comprises an opening 5, situated in the first compartment, providing an inlet for a particle flow into the chamber, an opening 6, also situated in the first compartment and preferably at the lowest point of the first compartment, providing an outlet for the suspension or wet paste at the end of the method and equipped with a valve, an opening 7 situated in the second compartment, for discharging gas from the chamber, also equipped with a valve, and an opening 8, situated in the second compartment, providing an inlet for a fluid into the chamber.

According to the invention, the filter acts both as means for filtering a flow comprising particles and as means for spraying a liquid or gaseous solvent to form a solvent droplet spray.

As the particle powder has a bulk density between 15 and 100 g/L, there is considerable space between the particles. The droplets will thus have access to the maximum particle surface area and the particle will eventually be captured by the droplets: the powder will thus no longer be in powder form and the particles will no longer be air-borne. The product recovered at the end of the method, the suspension or wet paste, will thus be suitable for safe, easy handling.

The solvent used may be chosen from water, alcohols, ketones or any other solvent chemically compatible with metals and the powders produced.

The solvent may be used on its own or with a dispersant, such as polyethylimine.

The particle dispersion may be enhanced by adding various dispersants into the solvent (the choice being made according to the nature of the solvent and the particles), and also using a bar magnet, placed in the bottom of the first compartment of the chamber.

The solvent, with or without dispersant, is located in a tank (not shown) situated downstream from the filter, the volume whereof is defined by the quantity of solvent to be injected into the chamber. A valve separates the tank from the chamber.

The solvent enters the chamber via the opening 8 situated in the second compartment.

The solvent is introduced by injecting solvent into the chamber. This injection may for example be obtained by vacuumising the chamber, and opening the separating valve between the chamber and the solvent tank, which introduces the liquid solvent into the chamber by a suction effect.

It is also possible to propel the liquid solvent into the chamber by applying a pressure by injecting, into the chamber, a compressed neutral gas, e.g. argon up to 20 L/min (6 bar). The argon flow rate is then maintained for a few minutes after having emptied the solvent tank (approximately 5 minutes), so as to promote the diffusion of the solvent throughout the volume left free by the network formed by the powder particles.

It should be noted that, if using a propellant gas, the valve for discharging the opening 7 should be opened.

For example, for a production of 5 kg of particles of nanometric size, the solvent volume should be 50 L and 33 L, respectively, to obtain 10% and 15% suspensions by mass of silicon carbide particles having a size of 35 nm and sending the solvent into the second compartment in liquid form.

The gaseous solvent is obtained by heating the solvent before introducing same into the chamber, e.g. using a steam generator.

If the solvent is introduced into the chamber in vapour phase, it is preferable to equip the chamber with a thermal mass flow control system, a controlled evaporation and mixing (CEM) system and a Coriolis effect digital liquid mass flow meter.

If metallic filters are used, gas phase solvents heated to temperatures above 100° C. can be introduced into the chamber.

In sum, unlike the prior art, the suspension or wet paste is not produced continuously with particle synthesis, but after the synthesis thereof.

Firstly, all the particles produced are introduced into the first compartment of the chamber in the form of a flow. It is also possible to vacuumise the chamber, prior to introducing the liquid or gaseous solvent, enhancing solvent dispersion.

When the particles are introduced into the first compartment, the filter acts as a filter: it initially filters the particles present in the particle flow.

When a liquid solvent is introduced into the second compartment, the filter then acts as a sprayer: it sprays the solvent in droplets between 1 and 10 micrometers in size by introducing liquid solvent through the filter in contra-flow with respect to the particle filtration.

When a gaseous solvent is introduced into the second compartment, the filter acts as a vapour solvent diffuser.

At the end of the method, the suspension or wet paste produced can be recovered by opening the valve at the opening 6 situated in the bottom of the first compartment of the chamber.

APPENDIX

High-efficiency filter classification as per the EN 1822 standard

| | | | Complete MPPS*** values | | Local MPPS*** values | | |
| --- | --- | --- | --- | --- | --- | --- | --- |
| EN 1822 standard | | Minimum | Maximum | Minimum | Minimum | Maximum | Minimum |
| Filter category | Filter class | efficiency (%) | penetration (%) | filtration ratio | efficiency (%) | penetration (%) | filtration ratio |
| HEPA* | H10 | 85 | 15 | 6,7 | — | — | — |
| | H11 | 95 | 5 | 20 | — | — | — |
| | H12 | 99.5 | 0.5 | 200 | — | — | — |
| | H13 | 99.95 | 0.05 | 2000 | 99.75 | 0.25 | 400 |
| | H14 | 99.995 | 0.005 | 20,000 | 99.975 | 0.025 | 4000 |
| ULPA** | U15 | 99.9995 | 0.0005 | 200,000 | 99.9975 | 0.0025 | 40,000 |
| | U16 | 99.99995 | 0.00005 | 2,000,000 | 99.99975 | 0.00025 | 400,000 |
| | U17 | 99.999995 | 0.000005 | 20,000,000 | 99.9999 | 0.0001 | 1,000,000 |

*HEPA: High Efficiency Particulate Air filter
**ULPA: Ultra Low Penetration Air filter
***MPPS: Most penetrating particle size
(Source France AIR).

The invention claimed is:

1. A device for producing a suspension or a wet paste of particles of nanometric or submicronic size, comprising:
    a chamber having a first and a second compartment arranged on top of each other;
    filtering means arranged in the chamber between the first and second compartments, said means being suitable for preventing passage of particles of nanometric or submicronic size, while enabling passage of a fluid, from one compartment to the other;
    means for introducing a flow of particles of nanometric or submicronic size having a bulk density between 15 and 100 g/L, situated in the first compartment;
    means for discharging gas, situated in the second compartment;
    means for injecting at least one fluid, situated in the second compartment, suitable for creating a flow from the filtering means, said flow being inverted with respect to the flow created by the means for introducing a flow of particles of nanometric or submicronic size;
    means for outputting suspension or wet paste of particles;
    wherein the device further comprises means for forming, in the first compartment, a spray formed from droplets of sizes between 1 and 10 microns, the means for forming a spray and the filtering means being a single element comprising a high-efficiency filter, as per the European standard EN 1822.

2. The device according to claim 1, wherein the fluid injected by the injection means is a liquid solvent at ambient temperature, the fluid being injected in liquid form or in gaseous form and forming the droplet spray at the filter outlet.

3. The device according to claim 1, wherein the high-efficiency filter is a metallic filter.

4. The device according to claim 1, wherein the filter pore size is less than or equal to 200 nm.

5. The device according to claim 1, wherein the first compartment is situated below the second compartment.

* * * * *